US012561882B2

(12) United States Patent
Wu et al.

(10) Patent No.: US 12,561,882 B2
(45) Date of Patent: Feb. 24, 2026

(54) IMAGE RENDERING METHOD AND APPARATUS

(71) Applicant: Beijing Zitiao Network Technology Co., Ltd., Beijing (CN)

(72) Inventors: Jinyuan Wu, Beijing (CN); Yi Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 138 days.

(21) Appl. No.: 18/552,777

(22) PCT Filed: Apr. 13, 2022

(86) PCT No.: PCT/CN2022/086528

§ 371 (c)(1),
(2) Date: Sep. 27, 2023

(87) PCT Pub. No.: WO2022/252833

PCT Pub. Date: Dec. 8, 2022

(65) Prior Publication Data

US 2024/0185500 A1 Jun. 6, 2024

(30) Foreign Application Priority Data

May 31, 2021 (CN) ......................... 202110602652.2

(51) Int. Cl.

*G06T 15/00* (2011.01)
*G06T 7/50* (2017.01)
*G06V 10/74* (2022.01)

(52) U.S. Cl.

CPC ................ *G06T 15/00* (2013.01); *G06T 7/50* (2017.01); *G06V 10/761* (2022.01)

(58) Field of Classification Search

CPC ........... G06T 15/00; G06T 7/50; G06T 17/00; G06V 10/761

See application file for complete search history.

(56) References Cited

U.S. PATENT DOCUMENTS 6,744,430 B1 6/2004 Shimizu
7,692,647 B2 4/2010 Lin et al.
(Continued)

FOREIGN PATENT DOCUMENTS

CN 104778737 A 7/2015
CN 106354251 A 1/2017
(Continued)

OTHER PUBLICATIONS

International Search Report and Written Opinion for International Application No. PCT/CN2022/086353, mailed Jun. 29, 2022, 12 pages.

(Continued)

*Primary Examiner* — Haixia Du

(57) ABSTRACT

This disclosure discloses an image rendering method and apparatus. The image rendering method includes: obtaining a first depth and a second depth corresponding to each pixel point in an image to be rendered, wherein the first depth is a depth of a real scene corresponding to the pixel point in a NDC system, and the second depth is a depth of a virtual scene corresponding to the pixel point in the NDC system; obtaining a depth difference between a depth of a real scene corresponding to the pixel point and a depth of a virtual scene corresponding to the pixel point in a camera coordinate system based on the first depth and the second depth; determining an opacity corresponding to the each pixel point according to the depth difference; and rendering a layer corresponding to the virtual scene to generate the image to be rendered based on the opacity.

18 Claims, 2 Drawing Sheets

(56) References Cited

U.S. PATENT DOCUMENTS

| | | | | |
|---|---|---|---|---|
| 10,926,176 | B1 | 2/2021 | Snyder et al. | |
| 2003/0179203 | A1 | 9/2003 | Bruderlin et al. | |
| 2008/0184124 | A1* | 7/2008 | Agarwal | G06Q 10/10 715/733 |
| 2009/0083015 | A1 | 3/2009 | McDaniel | |
| 2009/0111579 | A1 | 4/2009 | Komatsumoto | |
| 2018/0182066 | A1 | 6/2018 | Saleh et al. | |
| 2018/0249144 | A1* | 8/2018 | Feng | G06T 7/579 |
| 2020/0279438 | A1* | 9/2020 | Ohashi | H04N 13/111 |
| 2021/0142497 | A1 | 5/2021 | Pugh et al. | |
| 2021/0385321 | A1 | 12/2021 | Tran et al. | |
| 2023/0061935 | A1* | 3/2023 | Benedicto | G06V 10/60 |

FOREIGN PATENT DOCUMENTS

| | | | |
|---|---|---|---|
| CN | 107315915 | A | 11/2017 |
| CN | 107886574 | A | 4/2018 |
| CN | 108398787 | A | 8/2018 |
| CN | 109191556 | A | 1/2019 |
| CN | 110717269 | A | 1/2020 |
| CN | 111127609 | A | 5/2020 |
| CN | 111540035 | A | 8/2020 |
| CN | 111667393 | A | 9/2020 |
| CN | 111670464 | A | 9/2020 |
| CN | 112233214 | A | 1/2021 |
| CN | 112258658 | A | 1/2021 |
| CN | 112652044 | A | 4/2021 |

OTHER PUBLICATIONS

International Search Report and Written Opinion for International Application No. PCT/CN2022/086528, mailed Jun. 22, 2022, 16 pages.

International Search Report and Written Opinion for International Application No. PCT/CN2022/086561, mailed Jun. 30, 2022, 14 pages.

Shader, Jun. 10, 2022, pp. 1-6 (9 Pages), Retrieved from URL: https://zhuanlan.zhihu.com/p/9594344408.12J=I2019.

Shadertoy: “Starry Sky,” Views: 1878, Tags: Star, Sky, Dec. 7, 2019, 2 Pages, [Retrieved on Dec. 20, 2023] Retrieved from URL: https://www.shadertoy.com/view/tdKSWy.

Office action received from Chinese patent application No. 202110602652.2 mailed on Jul. 23, 2025, 18 pages (9 pages English Translation and 9 pages Original Copy).

Non-Final Office Action mailed on Jun. 26, 2025, for U.S. Appl. No. 18/551,738, pp. 42.

Tan et al., “Particle System Based Snow Simulating in Real Time”, SciVerse ScienceDirect, vol. 10, No. 1, 2011, pp. 1244-1249.

Notice of Allowance mailed on Oct. 29, 2025, for U.S. Appl. No. 18/551,738, pp. 16.

* cited by examiner

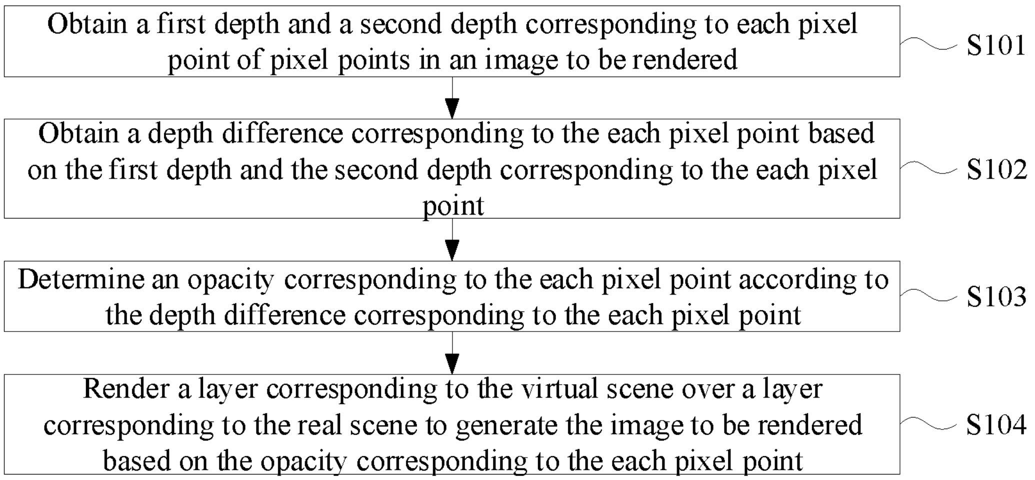

FIG. 1

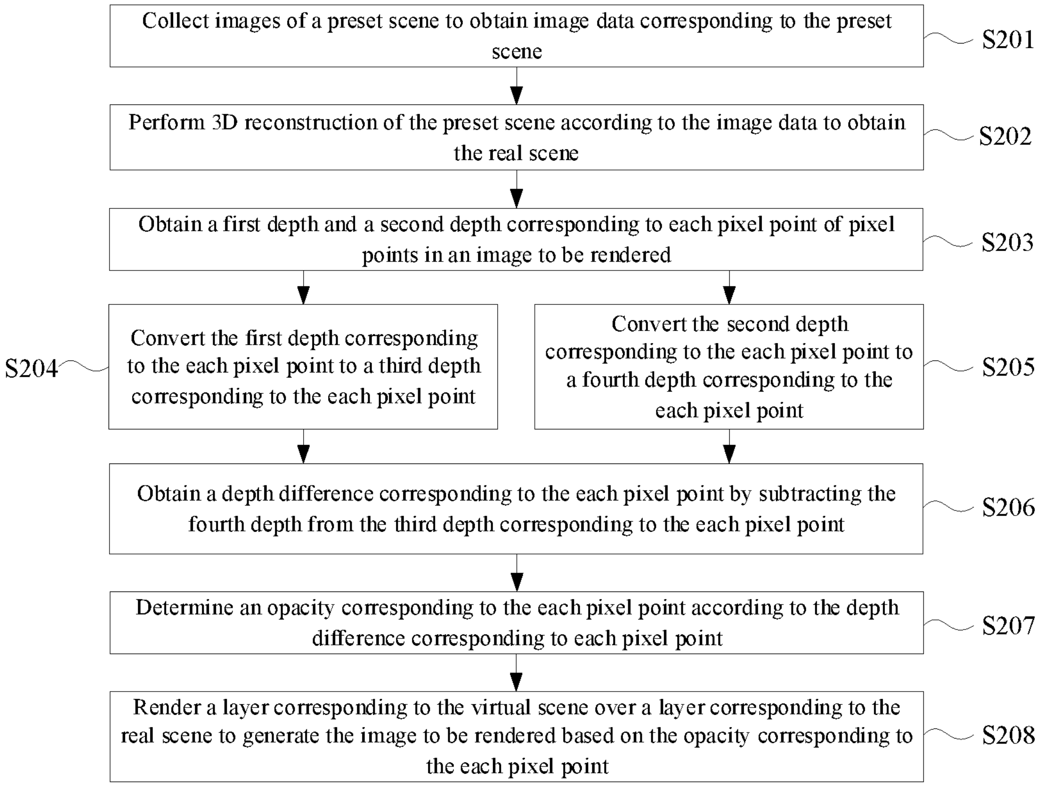

FIG. 2

| | |
|---|---|
| Obtain a first depth and a second depth corresponding to each pixel point of pixel points in an image to be rendered | S101 |
| Obtain a depth difference corresponding to the each pixel point based on the first depth and the second depth corresponding to the each pixel point | S102 |
| Determine an opacity corresponding to the each pixel point according to the depth difference corresponding to the each pixel point | S103 |
| Render a layer corresponding to the virtual scene over a layer corresponding to the real scene to generate the image to be rendered based on the opacity corresponding to the each pixel point | S104 |

| | |
|---|---|
| Collect images of a preset scene to obtain image data corresponding to the preset scene | S201 |
| Perform 3D reconstruction of the preset scene according to the image data to obtain the real scene | S202 |
| Obtain a first depth and a second depth corresponding to each pixel point of pixel points in an image to be rendered | S203 |
| Convert the first depth corresponding to the each pixel point to a third depth corresponding to the each pixel point (S204) / Convert the second depth corresponding to the each pixel point to a fourth depth corresponding to the each pixel point | S205 |
| Obtain a depth difference corresponding to the each pixel point by subtracting the fourth depth from the third depth corresponding to the each pixel point | S206 |
| Determine an opacity corresponding to the each pixel point according to the depth difference corresponding to each pixel point | S207 |
| Render a layer corresponding to the virtual scene over a layer corresponding to the real scene to generate the image to be rendered based on the opacity corresponding to the each pixel point | S208 |

IMAGE RENDERING METHOD AND APPARATUS

CROSS-REFERENCE TO RELATED APPLICATIONS

The present disclosure is a U.S. National Stage Application under 35 U.S.C. § 371 of International Patent Application No. PCT/CN2022/086528, filed on Apr. 13, 2022, which is based on and claims priority of Chinese application for invention No. 202110602652.2, filed on May 31, 2021, the disclosure of which is hereby incorporated into this disclosure by reference in its entirety.

TECHNICAL FIELD

The present disclosure relates to the field of Augmented Reality (AR) technology, in particular to an image rendering method and apparatus.

BACKGROUND

AR technology is a technology that can be used to integrate virtual information with the real world. It can simulate physical information that is difficult to experience in the real world by way of computer and other technologies, superimposing virtual information content on real-world content to create a sensory experience that goes beyond reality.

The ability to generate immersive effects is an important feature that distinguishes AR technology from other graphical display and human-computer interaction technologies. Immersion refers to the use of highly realistic displays and natural and seamless human-computer interaction that allows the user's attention to be fully focused on the environment created by VR technology, making it difficult to distinguish consciously or unconsciously between the virtual world and the real world. The commonly used image rendering method for implementing AR in related technologies comprises: obtaining relative positions of a virtual scene and a real scene based on a user's spatial position in the real environment; and directly superimposing and rendering a layer corresponding to the virtual scene on a layer corresponding to the real scene to obtain a final image presented to the user after aligning the virtual and real scenes based on their relative positions.

SUMMARY

In a first aspect, an embodiment of the present disclosure provides an image rendering method, comprising:

obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;

obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;

determining an opacity corresponding to the each pixel point according to the depth difference corresponding to the each pixel point, wherein the depth difference corresponding to the each pixel point is positively correlated with the opacity corresponding to the each pixel point; and rendering a layer corresponding to the virtual scene over a layer corresponding to the real scene to generate the image to be rendered based on the opacity corresponding to the each pixel point.

As an optional embodiment of the present disclosure, the obtaining the depth difference corresponding to the each pixel point based on the first depth and the second depth corresponding to the each pixel point comprises:

converting the first depth corresponding to the each pixel point to a third depth corresponding to the each pixel point, wherein the third depth corresponding to the pixel point is the depth of the real scene corresponding to the pixel point in the camera coordinate system;

converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

As an optional embodiment of the present disclosure, the converting the first depth corresponding to the each pixel point to the third depth corresponding to the each pixel point comprises: converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is inversely proportional to the third depth corresponding to the each pixel point.

As an optional embodiment of the present disclosure, the converting the first depth corresponding to the each pixel point to the third depth corresponding to the each pixel point comprises: converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is negatively correlated with the third depth corresponding to the each pixel point.

As an optional embodiment of the present disclosure, the converting the first depth corresponding to the each pixel point to the third depth corresponding to the each pixel point based on the distance from the virtual camera to the far plane of the view frustum and the distance from the virtual camera to the near plane of the view frustum comprises:

obtaining a first calculation value corresponding to the each pixel point, which is twice a product of the distance from the virtual camera to the far plane of the view frustum and the distance from the virtual camera to the near plane of the view frustum;

obtaining a second calculation value corresponding to the each pixel point, which is a difference between the distance from the virtual camera to the far plane of the view frustum and the distance from the virtual camera to the near plane of the view frustum;

obtaining a third calculation value corresponding to the each pixel point, which is a product of the second calculation value and the first depth corresponding to the pixel point;

obtaining a fourth calculation value corresponding to the each pixel point, which is a sum of the distance from the virtual camera to the far plane of the view frustum and the distance from the virtual camera to the near plane of the view frustum;

obtaining a fifth calculation value corresponding to the each pixel point, which is a difference between the third calculation value and the fourth calculation value; and obtaining a ratio of the first calculation value to the fifth calculation value corresponding to the each pixel point as the third depth corresponding to the each pixel point.

As an optional embodiment of the present disclosure, the converting the second depth corresponding to the each pixel point to the fourth depth corresponding to the each pixel point comprises: converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is inversely proportional to the fourth depth corresponding to the each pixel point.

As an optional embodiment of the present disclosure, the converting the second depth corresponding to the each pixel point to the fourth depth corresponding to the each pixel point comprises: converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is negatively correlated with the fourth depth corresponding to the each pixel point.

As an optional embodiment of the present disclosure, the converting the second depth corresponding to the each pixel point to the fourth depth corresponding to the each pixel point based on the distance from the virtual camera to the far plane of the view frustum and the distance from the virtual camera to the near plane of the view frustum comprises:

obtaining a sixth calculation value corresponding to the each pixel point, which is twice a product of the distance from the virtual camera to the far plane of the view frustum and the distance from the virtual camera to the near plane of the view frustum;

obtaining a seventh calculation value corresponding to the each pixel point, which is a difference between the distance from the virtual camera to the far plane of the view frustum and the distance from the virtual camera to the near plane of the view frustum;

obtaining an eighth calculation value corresponding to the each pixel point, which is a product of the seventh calculation value and the second depth corresponding to the each pixel point;

obtaining a ninth calculation value corresponding to the each pixel point, which is a sum of the distance from the virtual camera to the far plane of the view frustum and the distance from the virtual camera to the near plane of the view frustum;

obtaining a tenth calculation value corresponding to the each pixel point, which is a difference between the eighth calculation value and the ninth calculation value; and obtaining a ratio of the sixth calculation value to the tenth calculation value corresponding to the each pixel point as the fourth depth corresponding to the each pixel point.

As an optional embodiment of the present disclosure, the determining the opacity corresponding to the each pixel point according to the depth difference corresponding to the each pixel point comprises: determining that an opacity corresponding to a first pixel point is 0 in a case where a depth difference corresponding to the first pixel point is less than or equal to 0.

As an optional embodiment of the present disclosure, the determining the opacity corresponding to the each pixel point according to the depth difference corresponding to the each pixel point comprises:

determining that an opacity corresponding to a second pixel point is a ratio of a depth difference corresponding to the second pixel point to a preset threshold in a case where a depth difference corresponding to the second pixel point is greater than 0 and less than the preset threshold.

As an optional embodiment of the present disclosure, the determining the opacity corresponding to the each pixel point according to the depth difference corresponding to the each pixel point comprises:

determining that an opacity corresponding to a third pixel point is 100% in a case where a depth difference corresponding to the third pixel point is greater than or equal to a preset threshold.

As an optional embodiment of the present disclosure, the image rendering method further comprises:

collecting images of a preset scene to obtain image data corresponding to the preset scene before the obtaining the first depth and the second depth corresponding to the each pixel point of the pixel points in the image to be rendered; and performing three dimensional reconstruction of the preset scene according to the image data to obtain the real scene.

In a second aspect, an embodiment of the present disclosure provides an image rendering apparatus, comprising:

an obtaining unit for obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;

a calculation unit for obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;

a processing unit for determining an opacity corresponding to the each h pixel point according to the depth difference corresponding to the each pixel point, wherein the depth difference corresponding to the each pixel point is positively correlated with the opacity corresponding to the each pixel point; and a rendering unit for rendering a layer corresponding to the virtual scene over a layer corresponding to the real scene to generate the image to be rendered based on the opacity corresponding to the each pixel point.

As an optional embodiment of the present disclosure, the calculation unit is particularly used for converting the first depth corresponding to the each pixel point to a third depth corresponding to the each pixel point, wherein the third depth corresponding to the pixel point is the depth of the real scene corresponding to the pixel point in the camera coordinate system; converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

As an optional embodiment of the present disclosure, the calculation unit is particularly used for converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is inversely proportional to the third depth corresponding to the each pixel point.

As an optional embodiment of the present disclosure, the calculation unit is particularly used for converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is negatively correlated with the third depth corresponding to the each pixel point.

As an optional embodiment of the present disclosure, the calculation unit is particularly used for obtaining a first calculation value corresponding to the each pixel point, which is twice a product of the distance from the virtual camera to the far plane of the view frustum and the distance from the virtual camera to the near plane of the view frustum; obtaining a second calculation value corresponding to the each pixel point, which is a difference between the distance from the virtual camera to the far plane of the view frustum and the distance from the virtual camera to the near plane of the view frustum; obtaining a third calculation value corresponding to the each pixel point, which is a product of the second calculation value and the first depth corresponding to the pixel point; obtaining a fourth calculation value corresponding to the each pixel point, which is a sum of the distance from the virtual camera to the far plane of the view frustum and the distance from the virtual camera to the near plane of the view frustum; obtaining a fifth calculation value corresponding to the each pixel point, which is a difference between the third calculation value and the fourth calculation value; and obtaining a ratio of the first calculation value to the fifth calculation value corresponding to the each pixel point as the third depth corresponding to the each pixel point.

As an optional embodiment of the present disclosure, the calculation unit is particularly used for converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is inversely proportional to the fourth depth corresponding to the each pixel point.

As an optional embodiment of the present disclosure, the calculation unit is particularly used for converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is negatively correlated with the fourth depth corresponding to the each pixel point.

As an optional embodiment of the present disclosure, the calculation unit is particularly used for obtaining a sixth calculation value corresponding to the each pixel point, which is twice a product of the distance from the virtual camera to the far plane of the view frustum and the distance from the virtual camera to the near plane of the view frustum; obtaining a seventh calculation value corresponding to the each pixel point, which is a difference between the distance from the virtual camera to the far plane of the view frustum and the distance from the virtual camera to the near plane of the view frustum; obtaining an eighth calculation value corresponding to the each pixel point, which is a product of the seventh calculation value and the second depth corresponding to the each pixel point; obtaining a ninth calculation value corresponding to the each pixel point, which is a sum of the distance from the virtual camera to the far plane of the view frustum and the distance from the virtual camera to the near plane of the view frustum; obtaining a tenth calculation value corresponding to the each pixel point, which is a difference between the eighth calculation value and the ninth calculation value; and obtaining a ratio of the sixth calculation value to the tenth calculation value corresponding to the each pixel point as the fourth depth corresponding to the each pixel point.

As an optional embodiment of the present disclosure, the processing unit is particularly used for determining that an opacity corresponding to a first pixel point is 0 in a case where a depth difference corresponding to the first pixel point is less than or equal to 0.

As an optional embodiment of the present disclosure, the processing unit is particularly used for determining that an opacity corresponding to a second pixel point is a ratio of a depth difference corresponding to the second pixel point to a preset threshold in a case where a depth difference corresponding to the second pixel point is greater than 0 and less than the preset threshold.

As an optional embodiment of the present disclosure, the processing unit is particularly used for determining that an opacity corresponding to a third pixel point is 100% in a case where a depth difference corresponding to the third pixel point is greater than or equal to a preset threshold.

As an optional embodiment of the present disclosure, the obtaining unit is further used for collecting images of a preset scene to obtain image data corresponding to the preset scene before the obtaining the first depth and the second depth corresponding to the each pixel point of the pixel points in the image to be rendered; and performing three dimensional reconstruction of the preset scene according to the image data to obtain the real scene.

In a third aspect, an embodiment of the present disclosure provides an electronic device, comprising: a memory for storing a computer program; and a processor that, when executing the computer program, causes the electronic device to implement the image rendering method according to any of the above embodiments.

In a fourth aspect, an embodiment of the present disclosure provides a non-transitory computer-readable storage medium stored thereon a computer program that, when executed by a computing device, causes the computing device to implement the image rendering method according to any of the above embodiments.

In a fifth aspect, an embodiment of the present disclosure provides a computer program product that, when running on a computer, causes the computer to implement the image rendering method according to any of the above embodiments.

In a sixth aspect, an embodiment of the present disclosure provides a computer program, comprising: instructions that, when executed by a processor, cause the processor to implement the image rendering method according to any of the above embodiments.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

FIG. 1 is a flowchart of an image rendering method provided in an embodiment of the present disclosure;

FIG. 2 is another flowchart of the image rendering method provided in an embodiment of the present disclosure;

DETAILED DESCRIPTION

Figure 3:
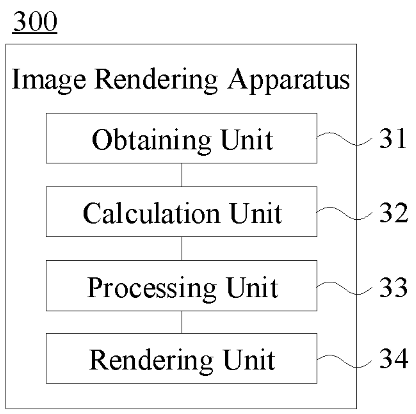
FIG. 3 is a structural diagram of an image rendering apparatus provided in an embodiment of the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

In the present disclosed embodiment, words such as "as an illustration" or "for example" are used to provide examples, illustrations, or explanations. Any embodiments or designs described with "as an illustration" or "for example" in the embodiments of the present disclosure should not be construed as being more preferred or advantageous than other embodiments or designs. In particular, the use of words such as "as an illustration" or "for example" is intended to present relevant concepts in a particular way. Moreover, in the description of the embodiments of the present disclosure, unless otherwise indicated, the phrase "a plurality of" means "two or more".

Although the image rendering method used in related technologies can also present both virtual and real scenes in a rendered image, there is no transition area between the layers corresponding to the virtual scene and the real scene, resulting in a sudden transition between the virtual and real scenes and poor immersion. Based on the above content, an embodiment of the present embodiment provides an image rendering method. As shown in FIG. 1, the image rendering method comprises the following steps.

In S101, a first depth and a second depth corresponding to each pixel point of pixel points in an image to be rendered are obtained.

The first depth corresponding to the pixel point is a depth of a real scene corresponding to the pixel point in a Normalized Device Coordinate (NDC) system, and the second depth corresponding to the pixel point is a depth of a virtual scene corresponding to the pixel point in the NDC system Specifically, the image to be rendered in this embodiment is an image generated by aligning a layer corresponding to the virtual scene with a layer corresponding to the real scene, and then rendering the layer corresponding to the virtual scene over the layer corresponding to the real scene. For example, a pixel $I_{1,1}$ in the image to be rendered is obtained by superimposing and rendering a pixel point $I'_{1,1}$ in a layer corresponding to the virtual scene on a pixel point $I''_{1,1}$ in a layer corresponding to the real scene. Therefore, the pixel points in the image to be rendered, the pixel points in the layer corresponding to the virtual scene, and the pixel points in the layer corresponding to the real scene have a one-to-one correspondence.

In S102, a depth difference corresponding to the each pixel point is obtained based on the first depth and the second depth corresponding to the each pixel point.

The depth difference corresponding to any of the pixel points is a difference between a depth of the real scene corresponding to the pixel point and a depth of the virtual scene corresponding to the pixel point in a camera coordinate system.

Due to the nonlinearity of scene depths in the NDC system, a difference between the first depth and the second depth in the NDC system cannot represent a difference between a depth of the real scene and a depth of the virtual scene corresponding to the pixel point. However, a difference between a depth of the real scene and a depth of the virtual scene corresponding to the pixel point in the camera coordinate system can represent the difference between the depth of the real scene and the depth of the virtual scene corresponding to the pixel point. Therefore, the depth difference obtained in this embodiment is the difference between the depth of the real scene and the depth of the virtual scene corresponding to the pixel point in the camera coordinate system.

In S103, an opacity corresponding to the each pixel point is determined according to the depth difference corresponding to the each pixel point.

The depth difference corresponding to the each pixel point is positively correlated with the opacity corresponding to the each pixel point.

That is, the greater the depth difference corresponding to the pixel point, the greater the opacity corresponding to the pixel point.

In addition, as opacity is a concept opposite to a relationship transparency, between the depth difference corresponding to the pixel point and the opacity corresponding to the pixel point can also be described as: the depth difference corresponding to the each pixel point is negatively correlated with the transparency corresponding to the each pixel point. That is, the greater the depth difference corresponding to the pixel point, the less the transparency corresponding to the pixel point.

In S104, a layer corresponding to the virtual scene is rendered over a layer corresponding to the real scene to generate the image to be rendered based on the opacity corresponding to the each pixel point.

The layer corresponding to the real scene in this embodiment may comprise a layer obtained by image acquisition of a real scene in the real world using an image acquisition device.

Specifically, rendering the layer corresponding to the virtual scene over the layer corresponding to the real scene based on the opacity corresponding to each pixel point comprises:

- determining the opacity of the each pixel point in the layer corresponding to the virtual scene based on the opacity corresponding to the each pixel point; and
- rendering the layer corresponding to the virtual scene over the layer corresponding to the real scene based on the opacity of the each pixel point in the layer corresponding to the virtual scene.

For example, if an opacity of a pixel $I_{i,j}$ in the image to be rendered is Alpha1, it is determined that an opacity of a pixel point $I'_{i,j}$ in the layer corresponding to the virtual scene is Alpha1, and when rendering the layer corresponding to the virtual scene over the layer corresponding to the real scene, an opacity of a pixel point $I'_{i,j}$ is set to Alpha1.

In the image rendering method provided in this embodiment of the present disclosure, the depth of the real scene and the depth of the virtual scene corresponding to the each pixel point in the image to be rendered in the NDC system are obtained firstly, then the depth difference between the depth of the real scene and the depth of the virtual scene corresponding to the each pixel point in the camera coordinate system is obtained based on the depth of the real scene and the depth of the virtual scene corresponding to the each pixel point in the NDC system; and then the opacity corresponding to the each pixel point is determined based on the depth difference between the depth of the real scene and the depth of the virtual scene corresponding to the each pixel point in the camera coordinate system; finally, the layer corresponding to the virtual scene is rendered over the layer corresponding to the real scene to generate the image to be rendered based on the opacity corresponding to the each pixel point. In the image rendering method provided in this embodiment of the present disclosure, the opacity corresponding to the each pixel point can be determined based on the difference between the depth of the real scene and the depth of the virtual scene corresponding to the each pixel point, and the layer corresponding to the virtual scene can be rendered based on the opacity corresponding to the each pixel point, and the depth difference corresponding to the each pixel point is positively correlated with the opacity corresponding to the each pixel point, when the depth difference corresponding to the pixel point is smaller. Therefore, when the depth difference corresponding to the pixel point is smaller, that is, when the depth of the real scene corresponding to the pixel point is close to the depth of the virtual scene corresponding to the pixel point, the corresponding pixel point in the layer corresponding to the virtual scene will be rendered on the layer corresponding to the real scene with a greater transparency; when the depth difference corresponding to the pixel point is greater, that is, when the depth of the real scene corresponding to the pixel point is significantly different from the depth of the virtual scene corresponding to the pixel point, the pixel point in the layer corresponding to the virtual scene will be rendered on the layer corresponding to the real scene with a lower transparency. Therefore, in the embodiment of the present disclosure, the closer the depth of the real scene is to the depth of the virtual scene, the more the layer corresponding to the real scene is visible through the layer corresponding to the virtual scene, thereby achieving a smooth transition between the virtual scene and the real scene. Therefore, the embodiment of the present disclosure can solve the problem of poor immersion caused by a sudden transition between virtual and real scenes in existing technologies.

An embodiment of the present embodiment further provides an image rendering method. As shown in FIG. 2, the image rendering method comprises the following steps.

In S201, images of a preset scene are collected to obtain image data corresponding to the preset scene.

Specifically, the preset scene may comprise any scene that actually exists in the real world.

In S202, 3D reconstruction of the preset scene is performed according to the image data to obtain the real scene.

That is, a 3D scene structure model of the preset scene is constructed based on the image data corresponding to the preset scene. By way of example, the 3D scene structure model of the preset scene can be constructed based on one or more of structured light, laser, photogrammetry, and optical flow technologies, etc. This disclosure will not limit the specific constructing method.

In S203, a first depth and a second depth corresponding to each pixel point of pixel points in an image to be rendered are obtained.

The first depth corresponding to the pixel point is a depth of a real scene corresponding to the pixel point in a NDC system, and the second depth corresponding to the pixel point is a depth of a virtual scene corresponding to the pixel point in the NDC system.

In S204, the first depth corresponding to the each pixel point is converted to a third depth corresponding to the each pixel point.

The third depth corresponding to the pixel point is the depth of the real scene corresponding to the pixel point in the camera coordinate system.

Optionally, the converting the first depth corresponding to the each pixel point to the third depth corresponding to the each pixel point in the above step S204 comprises following steps a to f.

In step a, a first calculation value corresponding to the each pixel point is obtained.

The first calculation value is twice a product of the distance from the virtual camera to the far plane of the view frustum and the distance from the virtual camera to the near plane of the view frustum.

If the distance from the virtual camera to the far plane of the view frustum is f, and the distance from the virtual camera to the near plane of the view frustum is n, the first calculation value is 2fn.

In step b, a second calculation value corresponding to the each pixel point is obtained.

The second calculation value is a difference between the distance from the virtual camera to the far plane of the view frustum and the distance from the virtual camera to the near plane of the view frustum.

In the above example, the second calculation value is f−n.

In step c, a third calculation value corresponding to the each pixel point is obtained.

The third calculation value is a product of the second calculation value and the first depth corresponding to the pixel point.

In the above example, if the first depth corresponding to the pixel point is $D_r$, the third calculation value is $(f-n)D_r$.

In step d, a fourth calculation value corresponding to the each pixel point is obtained.

The fourth calculation value is a sum of the distance from the virtual camera to the far plane of the view frustum and the distance from the virtual camera to the near plane of the view frustum.

In the above example, the fourth calculation value is f+n.

In step e, a fifth calculation value corresponding to the each pixel point is obtained.

The fifth calculation value is a difference between the third calculation value and the fourth calculation value.

In the above example, the fifth calculation value is $(f-n)D_r-(f+n)$.

In step f, a ratio of the first calculation value to the fifth calculation value corresponding to the each pixel point is obtained as the third depth corresponding to the each pixel point.

If the third depth corresponding to the pixel point is $Z_r$, Equation 1 is shown as follows:

$$Z_r = \frac{2fn}{(f-n)D_r - (f+n)}$$

wherein, $Z_r$ is the third depth corresponding to the pixel point, $D_r$ is the first depth corresponding to the pixel point, f is the distance from the virtual camera to the far plane of the view frustum, and n is the distance from the virtual camera to the near plane of the view frustum. It can be seen from the above equation that the first depth is negatively correlated with the third depth.

Specifically, the coordinate conversion relationship between the camera coordinate system and the NDC system is:

$$Z_n = \frac{-\frac{f+n}{f-n}Z_e - \frac{2fn}{f-n}}{-Z_e}$$

which can be deformed into:

$$Z_r = \frac{2fn}{(f-n)D_r - (f+n)}$$

Thus, the first depth corresponding to the each pixel point can be converted to the third depth corresponding to the each pixel point based on the equation $$Z_r = \frac{2fn}{(f-n)D_r - (f+n)}.$$

In S205, the second depth corresponding to the each pixel point is converted to a fourth depth corresponding to the each pixel point.

The fourth depth corresponding to any pixel point is the depth of the virtual scene corresponding to the pixel point in the camera coordinate system.

Optionally, the above step S205 (converting the second depth corresponding to the each pixel point to a fourth depth corresponding to the each pixel point) comprises following steps 1 to 6.

In step 1, a sixth calculation value corresponding to the each pixel point is obtained.

The sixth calculation value is twice a product of the distance from the virtual camera to the far plane of the view frustum and the distance from the virtual camera to the near plane of the view frustum.

If the distance from the virtual camera to the far plane of the view frustum is f, and the distance from the virtual camera to the near plane of the view frustum is n, the sixth calculation value is 2fn.

In step 2, a seventh calculation value corresponding to the each pixel point is obtained.

The seventh calculation value is a difference between the distance from the virtual camera to the far plane of the view frustum and the distance from the virtual camera to the near plane of the view frustum.

In the above example, the seventh calculation value is f−n.

In step 3, an eighth calculation value corresponding to the each pixel point is obtained.

The eighth calculation value is a product of the seventh calculation value and the second depth corresponding to the each pixel point.

In the above example, if the second depth corresponding to the pixel point is $D_s$, the eighth calculation value is $(f-n)D_s$.

In step 4, a ninth calculation value corresponding to the each pixel point is obtained.

The ninth calculation value is a sum of the distance from the virtual camera to the far plane of the view frustum and the distance from the virtual camera to the near plane of the view frustum.

In the above example, the ninth calculation value is f+n.

In step 5, a tenth calculation value corresponding to the each pixel point is obtained.

The tenth calculation value is a difference between the eighth calculation value and the ninth calculation value.

In the above example, the tenth calculation value is $(f-n)D_s-(f+n)$.

In step 6, a ratio of the sixth calculation value to the tenth calculation value corresponding to the each pixel point is obtained as the fourth depth corresponding to the each pixel point.

If the fourth depth corresponding to the pixel point is $Z_s$, the Equation 2 is shown as follows:

$$Z_s = \frac{2fn}{(f-n)D_s - (f+n)}$$

It can be seen from the above equation that the second depth is negatively correlated with the fourth depth.

The principle of converting the second depth corresponding to the each pixel point to the fourth depth corresponding to the each pixel point according to Equation 2 is similar to the principle of converting the first depth corresponding to the each pixel point to the third depth corresponding to the each pixel point according to Equation 1, which will not be repeated herein.

In S206, a depth difference corresponding to the each pixel point is obtained by subtracting the fourth depth from the third depth corresponding to the each pixel point.

If the depth difference corresponding to the pixel point is $Z_{delta}$, the third depth corresponding to the pixel point is $Z_r$, and the fourth depth corresponding to the pixel point is $Z_s$, then $$Z_{delta}=Z_r-Z_s$$

In S207, an opacity corresponding to the each pixel point is determined according to the depth difference corresponding to each pixel point.

The depth difference corresponding to each pixel point is positively correlated with the opacity corresponding to the each pixel point.

Optionally, the above step S207 (determining an opacity corresponding to the each pixel point according to the depth difference corresponding to each pixel point) comprises:

- determining that an opacity corresponding to a first pixel point is 0 in a case where a depth difference corresponding to the first pixel point is less than or equal to 0;
- determining that an opacity corresponding to a second pixel point is a ratio of a depth difference corresponding to the second pixel point to the preset threshold in a case where a depth difference corresponding to the second pixel point is greater than 0 and less than the preset threshold;
- determining that an opacity corresponding to a third pixel point is 100% in a case where a depth difference corresponding to the third pixel point is greater than or equal to the preset threshold.

The preset threshold can be set based on a transition range between the virtual scene and the real scene, and the value of the preset threshold is not limited in this embodiment.

If the opacity corresponding to the third pixel point is Alpha, and the preset threshold is $Z_{max}$, then for a pixel point, if $Z_{delta}\leq 0$, then Alpha=0, and the opacity of this pixel is 0, that is, its transparency is 100%.

For a pixel point, if $0<Z_{delta}<Z_{max}$, then $$\text{Alpha}=\text{clamp}(Z_{delta},0,Z_{max})/Z_{max}$$

The function clamp limits a value between an upper limit and a lower limit, for example, clamp(i, j, k) represents max(i, min(j, k)). That is, if $0<Z_{delta}<Z_{max}$, then the opacity corresponding to this pixel point is $Z_{delta}/Z_{max}$, and its transparency is $1-Z_{delta}/Z_{max}$.

In S208, a layer corresponding to the virtual scene is rendered over a layer corresponding to the real scene to generate the image to be rendered based on the opacity corresponding to the each pixel point.

In the image rendering method provided in this embodiment of the present disclosure, the depth of the real scene and the depth of the virtual scene corresponding to the each pixel point in the image to be rendered in the NDC system are obtained firstly, then based on the depth of the real scene and the depth of the virtual scene corresponding to the each pixel point in the NDC system, the depth difference between the depth of the real scene and the depth of the virtual scene corresponding to the each pixel point in the camera coordinate system is obtained; and then the opacity corresponding to the each pixel point is determined based on the depth difference between the depth of the real scene and the depth of the virtual scene corresponding to the each pixel point in the camera coordinate system; finally, the layer corresponding to the virtual scene is rendered over the layer corresponding to the real scene to generate the image to be rendered based on the opacity corresponding to the each pixel point. In the image rendering method provided in this embodiment of the present disclosure, the opacity corresponding to the each pixel point can be determined based on the difference between the depth of the real scene and the depth of the virtual scene corresponding to the each pixel point, and the layer corresponding to the virtual scene can be rendered based on the opacity corresponding to the each pixel point, and the depth difference corresponding to the each pixel point is positively correlated with the opacity corresponding to the each pixel point. Therefore, when the depth of the real scene corresponding to the pixel point is relatively close to the depth of the virtual scene, the corresponding pixel point in the layer corresponding to the virtual scene will be rendered on the layer corresponding to the real scene with a greater transparency; when the depth of the real scene corresponding to the pixel point differs significantly from the depth of the virtual scene, the pixel point in the layer corresponding to the virtual scene will be rendered on the layer corresponding to the real scene with a lower transparency. Therefore, in the embodiment of the present disclosure, the closer the depth of the real scene is to the depth of the virtual scene, the more the layer corresponding to the real scene is visible through the layer corresponding to the virtual scene, thereby achieving a smooth transition between the virtual scene and the real scene. Therefore, the embodiment of the present disclosure can solve the problem of poor immersion caused by a sudden transition between virtual and real scenes.

Based on the same inventive concept, as an implementation of the above method, an image rendering apparatus is further provided in an embodiment of the present disclosure. This apparatus embodiment corresponds to the above method embodiment. For ease of reading, the contents of the above method embodiment will not be explained in detail in this apparatus embodiment, but it should be clarified that the image rendering apparatus in this embodiment can correspond to all the contents in the above method embodiment.

An embodiment of the present disclosure provides an image rendering apparatus. FIG. 3 is a schematic structure diagram of the image rendering apparatus. As shown in FIG. 3, the image rendering apparatus 300 comprises:

- an obtaining unit 31 for obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;
- a calculation unit 32 for obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;
- a processing unit 33 for determining an opacity corresponding to the each pixel point according to the depth difference corresponding to the each pixel point, wherein the depth difference corresponding to the each pixel point is positively correlated with the opacity corresponding to the each pixel point; and a rendering unit 34 for rendering a layer corresponding to the virtual scene over a layer corresponding to the real scene to generate the image to be rendered based on the opacity corresponding to the each pixel point.

As an optional embodiment of the present disclosure, the calculation unit 32 is particularly used for converting the first depth corresponding to the each pixel point to a third depth corresponding to the each pixel point, wherein the third depth corresponding to the pixel point is the depth of the real scene corresponding to the pixel point in the camera coordinate system; converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

As an optional embodiment of the present disclosure, the calculation unit 32 is particularly used for converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is inversely proportional to the third depth corresponding to the each pixel point.

As an optional embodiment of the present disclosure, the calculation unit 32 is particularly used for converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is negatively correlated with the third depth corresponding to the each pixel point.

As an optional embodiment of the present disclosure, the calculation unit 32 is particularly used for obtaining a first calculation value corresponding to the each pixel point, which is twice a product of the distance from the virtual camera to the far plane of the view frustum and the distance from the virtual camera to the near plane of the view frustum; obtaining a second calculation value corresponding to the each pixel point, which is a difference between the distance from the virtual camera to the far plane of the view frustum and the distance from the virtual camera to the near plane of the view frustum; obtaining a third calculation value corresponding to the each pixel point, which is a product of the second calculation value and the first depth corresponding to the pixel point; obtaining a fourth calculation value corresponding to the each pixel point, which is a sum of the distance from the virtual camera to the far plane of the view frustum and the distance from the virtual camera to the near plane of the view frustum; obtaining a fifth calculation value corresponding to the each pixel point, which is a difference between the third calculation value and the fourth calculation value; and obtaining a ratio of the first calculation value to the fifth calculation value corresponding to the each pixel point as the third depth corresponding to the each pixel point.

As an optional embodiment of the present disclosure, the calculation unit 32 is particularly used for converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is inversely proportional to the fourth depth corresponding to the each pixel point.

As an optional embodiment of the present disclosure, the calculation unit 32 is particularly used for converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is negatively correlated with the fourth depth corresponding to the each pixel point.

As an optional embodiment of the present disclosure, the calculation unit 32 is particularly used for obtaining a sixth calculation value corresponding to the each pixel point, which is twice a product of the distance from the virtual camera to the far plane of the view frustum and the distance from the virtual camera to the near plane of the view frustum; obtaining a seventh calculation value corresponding to the each pixel point, which is a difference between the distance from the virtual camera to the far plane of the view frustum and the distance from the virtual camera to the near plane of the view frustum; obtaining an eighth calculation value corresponding to the each pixel point, which is a product of the seventh calculation value and the second depth corresponding to the each pixel point; obtaining a ninth calculation value corresponding to the each pixel point, which is a sum of the distance from the virtual camera to the far plane of the view frustum and the distance from the virtual camera to the near plane of the view frustum; obtaining a tenth calculation value corresponding to the each pixel point, which is a difference between the eighth calculation value and the ninth calculation value; and obtaining a ratio of the sixth calculation value to the tenth calculation value corresponding to the each pixel point as the fourth depth corresponding to the each pixel point.

As an optional embodiment of the present disclosure, the processing unit 33 is particularly used for determining that an opacity corresponding to a first pixel point is 0 in a case where a depth difference corresponding to the first pixel point is less than or equal to 0.

As an optional embodiment of the present disclosure, the processing unit 33 is particularly used for determining that an opacity corresponding to a second pixel point is a ratio of a depth difference corresponding to the second pixel point to a preset threshold in a case where a depth difference corresponding to the second pixel point is greater than 0 and less than the preset threshold.

As an optional embodiment of the present disclosure, the processing unit 33 is particularly used for determining that an opacity corresponding to a third pixel point is 100% in a case where a depth difference corresponding to the third pixel point is greater than or equal to a preset threshold.

As an optional embodiment of the present disclosure, the obtaining unit 31 is further used for collecting images of a preset scene to obtain image data corresponding to the preset scene before the obtaining the first depth and the second depth corresponding to the each pixel point of the pixel points in the image to be rendered; and performing three dimensional reconstruction of the preset scene according to the image data to obtain the real scene.

Figure 4:
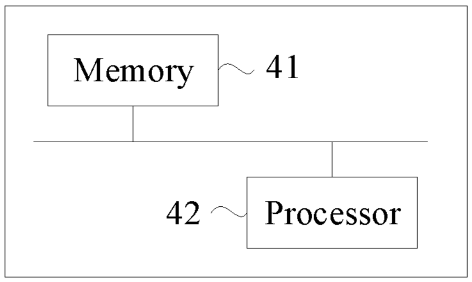
FIG. 4 is a schematic diagram the hardware structure of an electronic device provided in an embodiment of the present disclosure.

The image rendering apparatus provided in this embodiment can perform the image rendering method provided in the above method embodiment, and its principle and technical effect are similar to that of the method embodiment, which will not be repeated here. Based on the same inventive concept, an embodiment of the present disclosure further provides an electronic device. FIG. 4 is a schematic diagram showing the structure of the electronic device provided in an embodiment of the present disclosure. As shown in FIG. 4. The electronic device provided in this embodiment comprises: a memory 41 for storing a computer program; and a processor 42 that, when executing the computer program, causes the electronic device to implement the image rendering method according to any of the above embodiments.

An embodiment of the present disclosure further provides a non-transitory computer-readable storage medium stored thereon a computer program that, when executed by a computing device, causes the computing device to implement the image rendering method according to any of the above embodiments.

An embodiment of the present disclosure further provides a computer program product that, when running on a computer, causes the computer to implement the image rendering method according to any of the above embodiments.

One skilled in the art should understand that, the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable storage media having computer-usable program code embodied therein.

The processors may be central processing units (CPUs) or other general-purpose processors, digital signal processors (DSPs), application specific integrated circuits (ASICs), field programmable gate arrays (FPGAs) or other programmable logic devices, or discrete hardware components such as discrete gates or transistors. The general-purpose processor may be a microprocessor, or the processor may be any conventional processor or the like.

The memory may include non-permanent memory in a computer-readable medium, random access memory (RAM) and/or non-volatile memory, such as read only memory (ROM) or flash RAM. The memory is an example of a computer-readable medium.

The computer-readable media include permanent and non-permanent, removable and non-removable storage media. The storage medium can realize information storage by any method or technology. The information can be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape, magnetic disk storage or other magnetic storage devices, or any other non-transmission media that can be used to store information that can be accessed by computing devices. According to the definition herein, computer-readable media does not include transitory media, such as modulated data signals and carrier waves.

It shall be noted that: the above embodiments are merely illustration of the technical solution of this disclosure, but are not limitation thereof. Although this disclosure has been described in detail with reference to the above embodiment, those ordinary skilled in the art shall understand: the technical solutions recited in the various embodiments described above may be modified or some technical features thereof or all the technical features may be substituted equivalently, such modifications or substitutions do not deviate the nature of the technique from the scope of the technique embodied in the embodiments according to this disclosure.

What is claimed is:

1. An image rendering method, comprising:

obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;

obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;

determining an opacity corresponding to the each pixel point according to the depth difference corresponding to the each pixel point, wherein the depth difference corresponding to the each pixel point is positively correlated with the opacity corresponding to the each pixel point; and rendering a layer corresponding to the virtual scene over a layer corresponding to the real scene to generate the image to be rendered based on the opacity corresponding to the each pixel point, wherein the obtaining the depth difference corresponding to the each pixel point based on the first depth and the second depth corresponding to the each pixel point comprises:

converting the first depth corresponding to the each pixel point to a third depth corresponding to the each pixel point, wherein the third depth corresponding to the pixel point is the depth of the real scene corresponding to the pixel point in the camera coordinate system;

converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

2. The image rendering method according to claim 1, wherein the converting the first depth corresponding to the each pixel point to the third depth corresponding to the each pixel point comprises:

converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is inversely proportional to the third depth corresponding to the each pixel point.

3. The image rendering method according to claim 2, wherein the converting the first depth corresponding to the each pixel point to the third depth corresponding to the each pixel point based on the distance from the virtual camera to the far plane of the view frustum and the distance from the virtual camera to the near plane of the view frustum comprises:

obtaining a first calculation value corresponding to the each pixel point, which is twice a product of the distance from the virtual camera to the far plane of the view frustum and the distance from the virtual camera to the near plane of the view frustum;

obtaining a second calculation value corresponding to the each pixel point, which is a difference between the distance from the virtual camera to the far plane of the view frustum and the distance from the virtual camera to the near plane of the view frustum;

obtaining a third calculation value corresponding to the each pixel point, which is a product of the second calculation value and the first depth corresponding to the pixel point;

obtaining a fourth calculation value corresponding to the each pixel point, which is a sum of the distance from the virtual camera to the far plane of the view frustum and the distance from the virtual camera to the near plane of the view frustum;

obtaining a fifth calculation value corresponding to the each pixel point, which is a difference between the third calculation value and the fourth calculation value; and obtaining a ratio of the first calculation value to the fifth calculation value corresponding to the each pixel point as the third depth corresponding to the each pixel point.

4. The image rendering method according to claim 1, wherein the converting the first depth corresponding to the each pixel point to the third depth corresponding to the each pixel point comprises:

converting the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is negatively correlated with the third depth corresponding to the each pixel point.

5. The image rendering method according to claim 4, wherein the converting the first depth corresponding to the each pixel point to the third depth corresponding to the each pixel point based on the distance from the virtual camera to the far plane of the view frustum and the distance from the virtual camera to the near plane of the view frustum comprises:

obtaining a first calculation value corresponding to the each pixel point, which is twice a product of the distance from the virtual camera to the far plane of the view frustum and the distance from the virtual camera to the near plane of the view frustum;

obtaining a second calculation value corresponding to the each pixel point, which is a difference between the distance from the virtual camera to the far plane of the view frustum and the distance from the virtual camera to the near plane of the view frustum;

obtaining a third calculation value corresponding to the each pixel point, which is a product of the second calculation value and the first depth corresponding to the pixel point;

obtaining a fourth calculation value corresponding to the each pixel point, which is a sum of the distance from the virtual camera to the far plane of the view frustum and the distance from the virtual camera to the near plane of the view frustum;

obtaining a fifth calculation value corresponding to the each pixel point, which is a difference between the third calculation value and the fourth calculation value; and obtaining a ratio of the first calculation value to the fifth calculation value corresponding to the each pixel point as the third depth corresponding to the each pixel point.

6. The image rendering method according to claim 1, wherein the converting the second depth corresponding to the each pixel point to the fourth depth corresponding to the each pixel point comprises:

converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is inversely proportional to the fourth depth corresponding to the each pixel point.

7. The image rendering method according to claim 6, wherein the converting the second depth corresponding to the each pixel point to the fourth depth corresponding to the each pixel point based on the distance from the virtual camera to the far plane of the view frustum and the distance from the virtual camera to the near plane of the view frustum comprises:

obtaining a sixth calculation value corresponding to the each pixel point, which is twice a product of the distance from the virtual camera to the far plane of the view frustum and the distance from the virtual camera to the near plane of the view frustum;

obtaining a seventh calculation value corresponding to the each pixel point, which is a difference between the distance from the virtual camera to the far plane of the view frustum and the distance from the virtual camera to the near plane of the view frustum;

obtaining an eighth calculation value corresponding to the each pixel point, which is a product of the seventh calculation value and the second depth corresponding to the each pixel point;

obtaining a ninth calculation value corresponding to the each pixel point, which is a sum of the distance from the virtual camera to the far plane of the view frustum and the distance from the virtual camera to the near plane of the view frustum;

obtaining a tenth calculation value corresponding to the each pixel point, which is a difference between the eighth calculation value and the ninth calculation value; and obtaining a ratio of the sixth calculation value to the tenth calculation value corresponding to the each pixel point as the fourth depth corresponding to the each pixel point.

8. The image rendering method according to claim 1, wherein the converting the second depth corresponding to the each pixel point to the fourth depth corresponding to the each pixel point comprises:

converting the second depth corresponding to the each pixel point to the fourth depth corresponding to the each pixel point based on a distance from a virtual camera to a far plane of a view frustum and a distance from the virtual camera to a near plane of the view frustum, wherein the second depth corresponding to the each pixel point is negatively correlated with the fourth depth corresponding to the each pixel point.

9. The image rendering method according to claim 8, wherein the converting the second depth corresponding to the each pixel point to the fourth depth corresponding to the each pixel point based on the distance from the virtual camera to the far plane of the view frustum and the distance from the virtual camera to the near plane of the view frustum comprises:

obtaining a sixth calculation value corresponding to the each pixel point, which is twice a product of the distance from the virtual camera to the far plane of the view frustum and the distance from the virtual camera to the near plane of the view frustum;

obtaining a seventh calculation value corresponding to the each pixel point, which is a difference between the distance from the virtual camera to the far plane of the view frustum and the distance from the virtual camera to the near plane of the view frustum;

obtaining an eighth calculation value corresponding to the each pixel point, which is a product of the seventh calculation value and the second depth corresponding to the each pixel point;

obtaining a ninth calculation value corresponding to the each pixel point, which is a sum of the distance from the virtual camera to the far plane of the view frustum and the distance from the virtual camera to the near plane of the view frustum;

obtaining a tenth calculation value corresponding to the each pixel point, which is a difference between the eighth calculation value and the ninth calculation value; and obtaining a ratio of the sixth calculation value to the tenth calculation value corresponding to the each pixel point as the fourth depth corresponding to the each pixel point.

10. The image rendering method according to claim 1, wherein the determining the opacity corresponding to the each pixel point according to the depth difference corresponding to the each pixel point comprises:

determining that an opacity corresponding to a first pixel point is 0 in a case where a depth difference corresponding to the first pixel point is less than or equal to 0.

11. The image rendering method according to claim 1, wherein the determining the opacity corresponding to the each pixel point according to the depth difference corresponding to the each pixel point comprises:

determining that an opacity corresponding to a second pixel point is a ratio of a depth difference corresponding to the second pixel point to a preset threshold in a case where a depth difference corresponding to the second pixel point is greater than 0 and less than the preset threshold.

12. The image rendering method according to claim 1, wherein the determining the opacity corresponding to the each pixel point according to the depth difference corresponding to the each pixel point comprises:

determining that an opacity corresponding to a third pixel point is 100% in a case where a depth difference corresponding to the third pixel point is greater than or equal to a preset threshold.

13. The image rendering method according to claim 1, further comprising:

collecting images of a preset scene to obtain image data corresponding to the preset scene before the obtaining the first depth and the second depth corresponding to the each pixel point of the pixel points in the image to be rendered; and performing three dimensional reconstruction of the preset scene according to the image data to obtain the real scene.

14. An electronic device, comprising:

a memory for storing a computer program; and a processor that, when executing the computer program, causes the electronic device to implement an image rendering method comprising:

obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;

obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;

determining an opacity corresponding to the each pixel point according to the depth difference corresponding to the each pixel point, wherein the depth difference corresponding to the each pixel point is positively correlated with the opacity corresponding to the each pixel point; and rendering a layer corresponding to the virtual scene over a layer corresponding to the real scene to generate the image to be rendered based on the opacity corresponding to the each pixel point, the obtaining the depth difference corresponding to the each pixel point based on the first depth and the second depth corresponding to the each pixel point comprises converting the first depth corresponding to the each pixel point to a third depth corresponding to the each pixel point, wherein the third depth corresponding to the pixel point is the depth of the real scene corresponding to the pixel point in the camera coordinate system;

converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

15. The electronic device according to claim 14, wherein the processor is configured to:

convert the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is inversely proportional to the third depth corresponding to the each pixel point.

16. The electronic device according to claim 15, wherein the processor is configured to:

obtain a first calculation value corresponding to the each pixel point, which is twice a product of the distance from the virtual camera to the far plane of the view frustum and the distance from the virtual camera to the near plane of the view frustum;

obtain a second calculation value corresponding to the each pixel point, which is a difference between the distance from the virtual camera to the far plane of the view frustum and the distance from the virtual camera to the near plane of the view frustum;

obtain a third calculation value corresponding to the each pixel point, which is a product of the second calculation value and the first depth corresponding to the pixel point;

obtain a fourth calculation value corresponding to the each pixel point, which is a sum of the distance from the virtual camera to the far plane of the view frustum and the distance from the virtual camera to the near plane of the view frustum;

obtain a fifth calculation value corresponding to the each pixel point, which is a difference between the third calculation value and the fourth calculation value; and obtain a ratio of the first calculation value to the fifth calculation value corresponding to the each pixel point as the third depth corresponding to the each pixel point.

17. The electronic device according to claim 14, wherein the processor is configured to:

convert the first depth corresponding to the each pixel point to the third depth corresponding to the each pixel point based on a distance from a virtual camera to a far plane of a view frustum and a distance from the virtual camera to a near plane of the view frustum, wherein the first depth corresponding to the each pixel point is negatively correlated with the third depth corresponding to the each pixel point.

18. A non-transitory computer-readable storage medium stored thereon a computer program that, when executed by a computing device, causes the computing device to implement an image rendering method comprising:

obtaining a first depth and a second depth corresponding to each pixel point of pixel points in an image to be rendered, wherein the first depth corresponding to the pixel point is a depth of a real scene corresponding to the pixel point in a Normalized Device Coordinate system, and the second depth corresponding to the pixel point is a depth of a virtual scene corresponding to the pixel point in the Normalized Device Coordinate system;

obtaining a depth difference corresponding to the each pixel point based on the first depth and the second depth corresponding to the each pixel point, wherein the depth difference corresponding to the pixel point is a difference between a depth of a real scene corresponding to the pixel point and a depth of a virtual scene corresponding to the pixel point in a camera coordinate system;

determining an opacity corresponding to the each pixel point according to the depth difference corresponding to the each pixel point, wherein the depth difference corresponding to the each pixel point is positively correlated with the opacity corresponding to the each pixel point; and rendering a layer corresponding to the virtual scene over a layer corresponding to the real scene to generate the image to be rendered based on the opacity corresponding to the each pixel point;

the obtaining the depth difference corresponding to the each pixel point based on the first depth and the second depth corresponding to the each pixel point comprises:

converting the first depth corresponding to the each pixel point to a third depth corresponding to the each pixel point, wherein the third depth corresponding to the pixel point is the depth of the real scene corresponding to the pixel point in the camera coordinate system;

converting the second depth corresponding to the each pixel point to a fourth depth corresponding to the each pixel point, wherein the fourth depth corresponding to the pixel point is the depth of the virtual scene corresponding to the pixel point in the camera coordinate system; and obtaining the depth difference corresponding to the each pixel point by subtracting the third depth from the fourth depth corresponding to the each pixel point.

* * * * *